(12) United States Patent  
Munro et al.

(10) Patent No.: US 8,808,894 B2
(45) Date of Patent: Aug. 19, 2014

(54) BATTERY TRAY RETAINING SYSTEM

(75) Inventors: Scott Munro, Clarkston, MI (US); Luke D. Griffith, Oxford, MI (US); George F. Gauchey, Novi, MI (US); Randy T. Gerken, Novi, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 240 days.

(21) Appl. No.: 13/358,124

(22) Filed: Jan. 25, 2012

(65) Prior Publication Data

US 2013/0189555 A1 Jul. 25, 2013

(51) Int. Cl.
*H01M 2/10* (2006.01)

(52) U.S. Cl.
USPC ......................................... 429/100; 180/68.5

(58) Field of Classification Search
CPC .. H01M 2/1077; H01M 2/1083; B60R 16/04; B60K 1/04
USPC ......................................... 429/100; 180/68.5
See application file for complete search history.

(56) References Cited

U.S. PATENT DOCUMENTS

| | | |
|---|---|---|
| 2,947,373 A | 8/1960 | Wilson |
| 3,033,304 A | 5/1962 | Kramer |
| 3,053,336 A | 9/1962 | Zednik, Jr. |
| 3,105,566 A | 10/1963 | Raney et al. |
| 3,165,163 A | 1/1965 | Holka |
| 3,167,148 A | 1/1965 | Hinch |
| 3,498,400 A | 3/1970 | Hysmith |
| 3,821,997 A | 7/1974 | Sieren |
| 3,903,981 A | 9/1975 | Peterson |
| 4,013,136 A | 3/1977 | Fear |
| 4,926,953 A | 5/1990 | Platt |
| 4,936,409 A | 6/1990 | Nix et al. |
| 6,102,356 A | 8/2000 | Huntley et al. |
| 6,161,810 A | 12/2000 | Crow et al. |
| 6,593,027 B1 | 7/2003 | Osterhart et al. |

(Continued)

FOREIGN PATENT DOCUMENTS

| | | |
|---|---|---|
| FR | 2891515 A1 | 4/2007 |
| GB | 912107 | 12/1962 |
| GB | 2142292 | 1/1985 |

OTHER PUBLICATIONS

International Search Report dated Apr. 4, 2013 for International Application No. PCT/US2013/022365, International Filing Date Jan. 21, 2013.

(Continued)

*Primary Examiner* — Jonathan Jelsma
(74) *Attorney, Agent, or Firm* — Ralph E Smith

(57) ABSTRACT

A battery tray can include a deck, first and second longitudinal and side walls and a clamping member. The walls can extend from the deck and cooperate with each other to form a container area for receiving one of a first and a second battery, where the first battery has a longer length than the second battery. The second longitudinal and side walls can include respective first and second battery hold down members each having a rib for engaging one of the first and second batteries. The first longitudinal and side walls can include respective first and second ramped members for urging at least the first battery into engagement with the battery hold down members. The first clamping member can be removably coupled to the battery tray relative to one of the first longitudinal or side walls and can engage the first or second battery positioned on the deck.

20 Claims, 13 Drawing Sheets

(56) References Cited

U.S. PATENT DOCUMENTS

| | | | |
|---|---|---|---|
| 6,871,829 B2 * | 3/2005 | Shannon, Jr. | 248/505 |
| 7,014,002 B2 | 3/2006 | Mizuta | |
| 7,543,666 B2 | 6/2009 | Connelly et al. | |
| 7,726,427 B2 | 6/2010 | Picavet | |
| 2002/0162696 A1 | 11/2002 | Maus et al. | |
| 2008/0169676 A1 | 7/2008 | Hanson et al. | |

OTHER PUBLICATIONS

Written Opinion dated Apr. 4, 2013 for International Application No. PCT/US2013/022365, International Filing Date Jan. 21, 2013.

* cited by examiner

BATTERY TRAY RETAINING SYSTEM

FIELD

The present disclosure relates generally to a battery retaining system and, more particularly, to a battery tray retaining system for a vehicle.

BACKGROUND

Batteries, such as lead acid batteries, are used in a wide variety of today's vehicles powered by internal combustion engines. These batteries are typically positioned in or on a support structure to secure the battery to the vehicle. In some vehicle applications, the support structure can include a battery shelf and tie down strap. In other vehicle applications, the support structure can be in the form of a container designed for a specific battery for that vehicle. As various different size batteries can be used for different models of the vehicle, such designs often require the use of multiple battery containers of different sizes to accommodate the various different sizes of batteries. For example, a larger sized battery may be used for a heavy duty version of a pick-up truck as compared to the light duty version, which would require two different battery containers to accommodate the differently sized batteries used for such a vehicle line-up.

Thus, while conventional battery containers have worked for their intended purpose, there remains a need for improvement in the relevant art.

SUMMARY

In one form, a battery tray for a vehicle is provided in accordance with the present teachings. The battery tray can include a deck, first and second opposed longitudinal walls, first and second opposed side walls and a first clamping member. The first and second longitudinal walls can extend from the deck and can cooperate with the first and second side walls extending from the deck to form a container area. The container area can be adapted to receive at least one of a first and a second battery, where the first battery can have a longer longitudinal length than the second battery. The second longitudinal and side walls can include respective first and second battery hold down members each having a rib adapted to engage a retention feature of the first or second battery. The first longitudinal and side walls can include respective first and second ramped members adapted to urge at least the first battery into engagement with the respective first and second battery hold down members upon the first battery being positioned on the deck. The first clamping member can be removably coupled to the battery tray relative to one of the first longitudinal or side walls and can be adapted to engage the retention feature of the one of the first and second batteries positioned in the container area.

In another form, a battery tray for a vehicle is provided in accordance with the present teachings. The battery tray can include a deck, first and second opposed longitudinal walls, first and second opposed side walls and a first clamping member. The first and second longitudinal walls can extend from the deck and can cooperate with the first and second side walls extending from the deck to form a container area adapted to receive at least one of a first and a second battery. The first and second longitudinal and side walls can be integrally formed with the deck. The first battery can have a longer longitudinal length than the second battery. The second longitudinal and side walls can include respective first and second battery hold down members each having a horizontally extending rib adapted to engage a retention feature of the first or second battery and an upper angled guide surface. The ribs can be vertically spaced apart from the deck and the angled guide surfaces can extend from the ribs along the respective second longitudinal and side walls. The first longitudinal and side walls can include respective first and second ramped members adapted to urge at least the first battery into engagement with the respective first and second battery hold down members upon the first battery being positioned on the deck. The first clamping member can be removably coupled to the battery tray relative to the first side wall and can be adapted to engage the retention feature of the one of the first and second batteries positioned in the container area.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
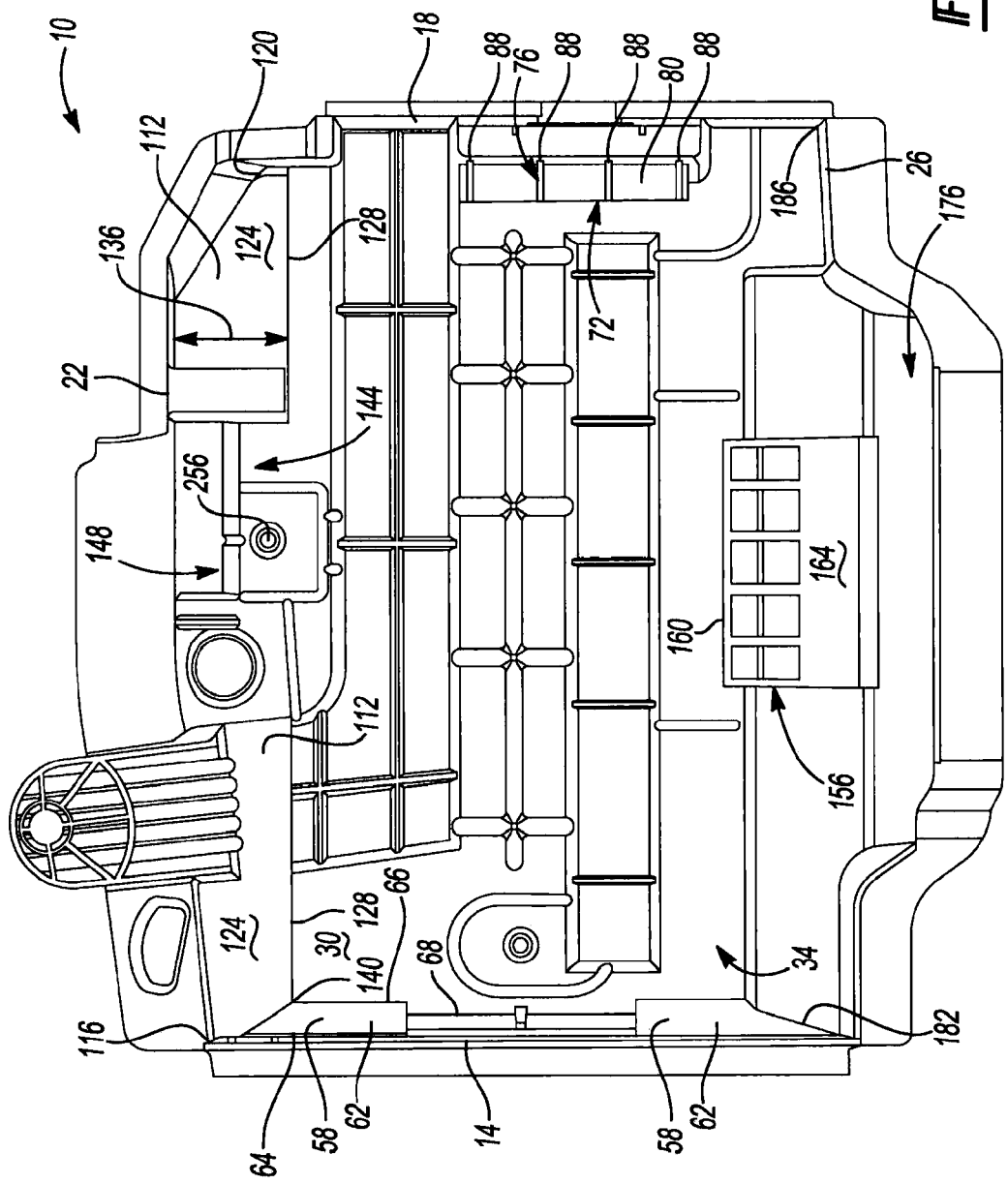
FIG. 1 is a top view of an exemplary battery tray having an exemplary battery locking system according to the principles of the present disclosure.
Figure 2:
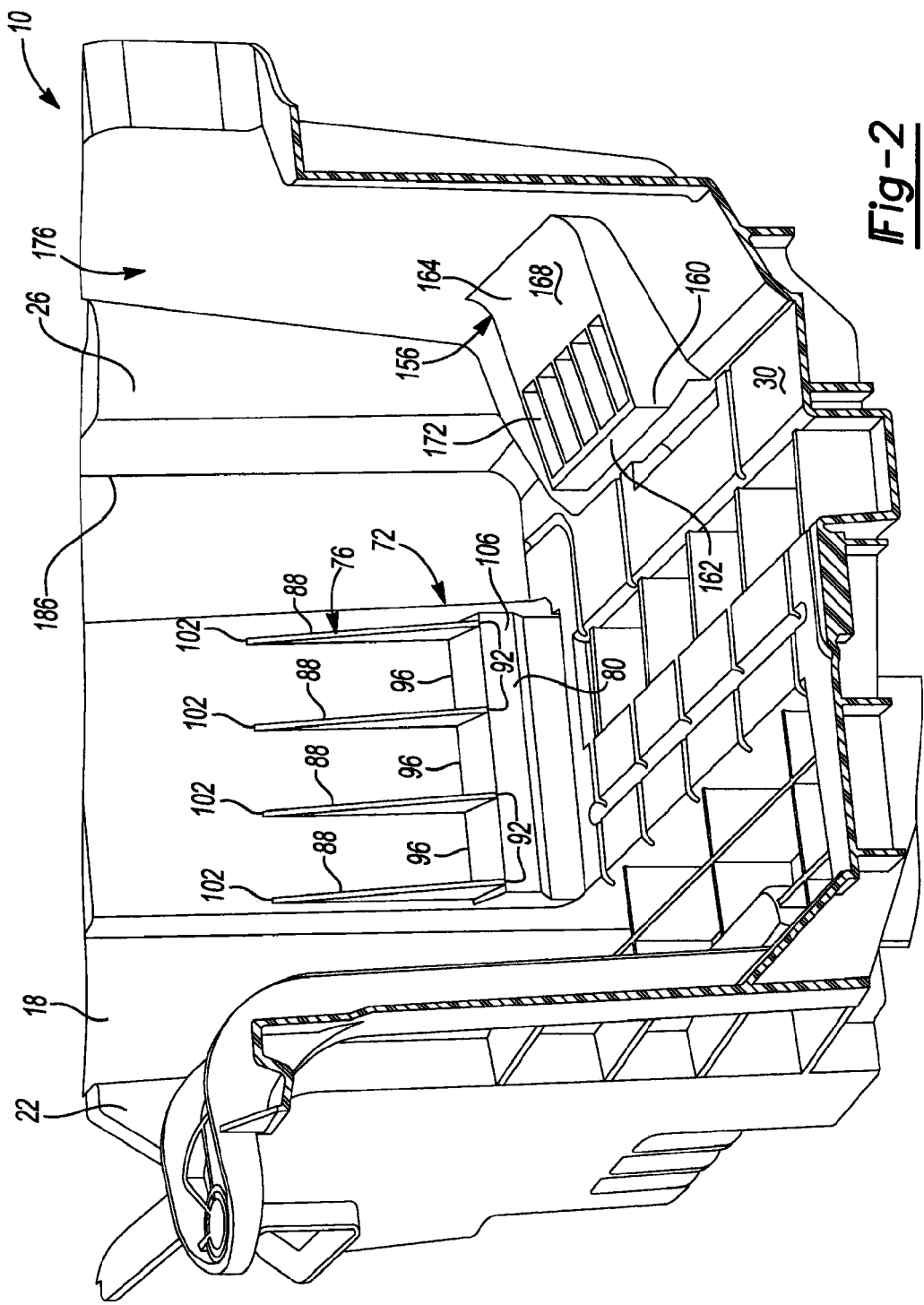
FIG. 2 is a sectional view of the battery tray of FIG. 1 according to the principles of the present disclosure.
Figure 3:
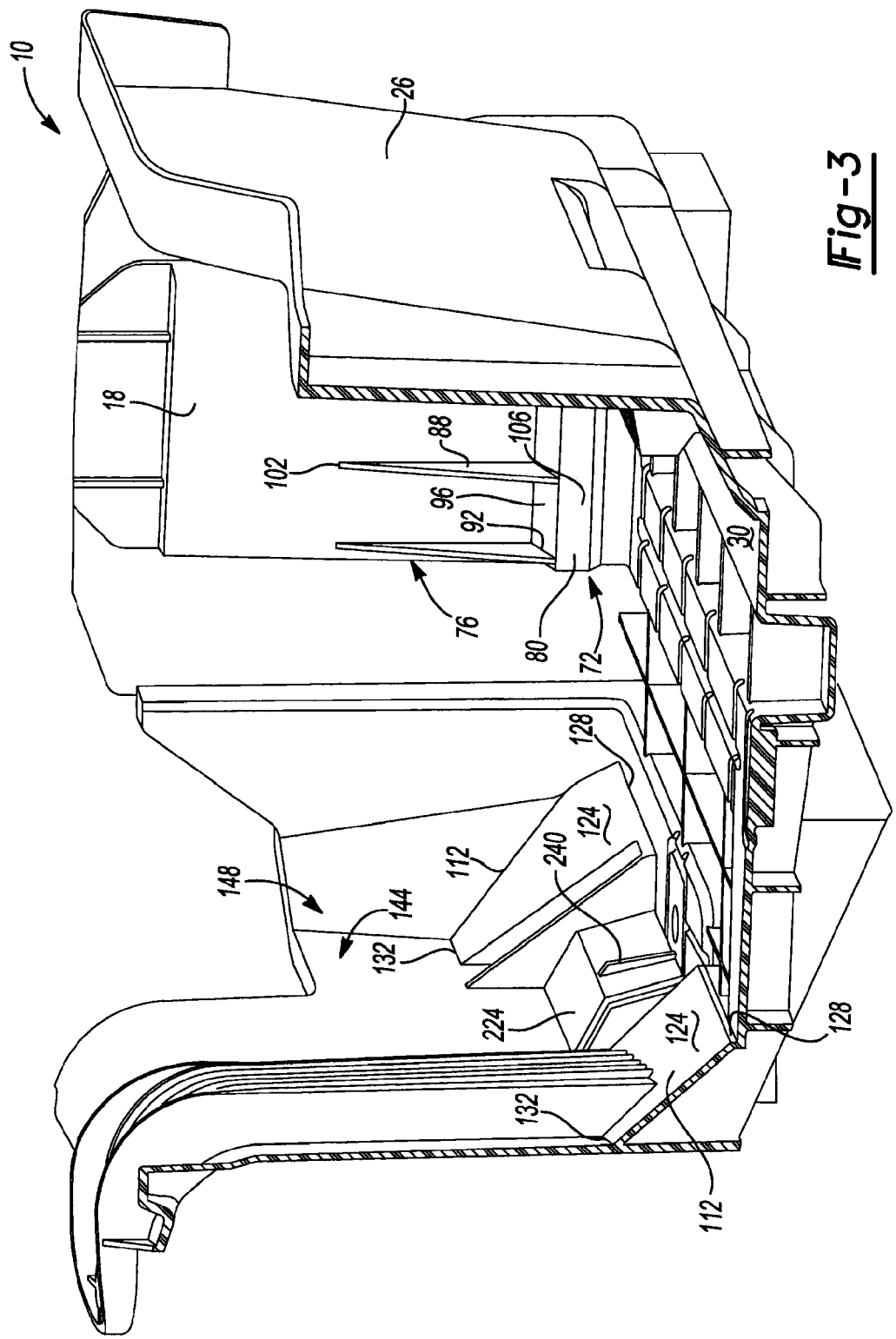
FIG. 3 is another sectional view of the battery tray of FIG. 1 according to the principles of the present disclosure.

With initial reference to FIGS. 1-3, an exemplary battery tray identified with reference to character 10 is shown in accordance with an aspect of the present teachings. As will be discussed in greater detail below, battery tray 10 can accommodate various different size batteries, as well as facilitate ease of positioning a battery therein. Further, battery tray 10 can utilize various clamp or hold down members to accommodate the various different size batteries.

The battery tray 10 can be formed from various materials, such as a polymer, and can be positioned in an engine compartment or under a hood area of a vehicle as is known in the art. Battery tray 10 can include first and second side walls 14, 18 and first and second longitudinally extending walls 22, 26, as shown for example in FIG. 1. The four walls 14, 18, 22, 26 together with a bottom or deck 30 can form a container area 34 configured to surround at least a portion of the four sides of a battery, such as sides 38, 42, 46, 50 of exemplary battery 54A shown in FIG. 4.

Each wall 14, 18, 22, 26 can include at least one angled ramp member configured to guide positioning of battery 54A into container area 34. In particular, first side wall 14 can include a pair of ramped members 58 having an angled battery guide surface 62. The guide surfaces 62 can be inclined away from first side wall 14 in a direction toward second side wall 18 as they extend from a second end 64 to an opposite first end 66 at deck 30, as shown for example in FIG. 1. First side wall 14 can include or define a recessed area 68 formed between the outwardly extending ramped members 58 and configured to selectively receive a battery mounting block or clamp member, as will be discussed in greater detail below.

Second side wall 18 can include a first battery hold down member 72 integrally formed with side wall 18. First battery hold down member 72 can also include a battery guide portion 76 integrally formed with the hold down member 72 and second side wall 18 as one unitary component. First battery hold down member 72 can include a rib or protrusion 80 extending outwardly from second side wall 18 in a direction toward first side wall 14, as shown for example in FIG. 2. Rib 80 can be horizontally spaced from deck 30 and configured to receive a retaining flange associated with battery 54A, as will be discussed below. The battery guide portion 76 associated with battery hold down member 72 can include a plurality of vertically extending horizontally spaced ribs 88, as shown for example in FIGS. 1 and 2. The ribs 88 can extend vertically from a first end 92 at a top surface 96 of rib 80 toward a top of second side wall 18 to a second end 102. The ribs 88 can be angled as shown in FIG. 2 such that they extend outwardly by an increasing amount from the first end 92 to the second end 102. In the exemplary configuration illustrated in FIGS. 1 and 2, ribs 88 can be flush or substantially flush at their second end with an outer surface 106 of rib 80.

First longitudinal wall 22 can include a pair of vertically extending ramped members 112 positioned about opposed ends 116, 120 of wall 22, as shown for example in FIGS. 1 and 3. Ramped members 112 can each include an angled battery guide surface 124 extending from a first end 128 at deck 30 to a second opposite end 132 on longitudinal wall 22 vertically spaced from deck 30. The guide surfaces 124 can extend outwardly from wall 22 by an increasing amount from second end 132 to first end 128. In the exemplary configuration illustrated, the ramped members 112 can extend outwardly at the first end 128 from longitudinal wall 22 by a distance 136, which is greater than a corresponding amount of extension of ramped members 58 at their first end 66, as shown for example in FIG. 1. In one exemplary configuration, the ramped member 112 at end 116 of second longitudinal wall 22 can engage one of the ramped members 58, forming a retaining corner 140.

The greater outward extension of ramped members 112 can provide for positioning battery 54A spaced from longitudinal wall 22 by the distance 136, which can also provide clearance or space 144 for receiving a positioning tool and/or mounting or clamping member between battery 54A and longitudinal wall 22, as will be discussed in greater detail below. In this regard, battery tray 10 can define or include a recessed area 148 between ramped members 112 for receiving such a clamping member.

Second longitudinal wall 26 can include a second battery hold down member 156 integrally formed therewith and configured to aid in retaining battery 54A in battery tray 10. Second battery hold down member 156 can include a rib 160 having an outer surface 162 projecting outwardly from longitudinal wall 26 and/or a body 164 of hold down member 156, as shown for example in FIG. 2. Rib 160 can be horizontally extending and vertically spaced from deck 30 so as to receive a battery retaining toe flange associated with battery 54A, as will be discussed below. Second battery hold down member 156 can also include an angled upper surface 168 configured to aid in guiding battery 54A toward deck 30. In the exemplary configuration illustrated, upper surface 168 can include a plurality of horizontally spaced ribs 172. In one exemplary configuration, the second longitudinal wall 26 can include a recessed area 176 formed between opposed ends 182, 186 of wall 26 and spaced apart therefrom, as shown for example in FIG. 1. Recessed area 176 can aid in facilitating receipt of battery 54A in container area 34, such as by providing clearance for a battery positioning tool or an operator's hand, etc.

In operation, the battery tray 10 can receive and retain batteries of various sizes and therefore eliminate or substantially eliminate a need for a vehicle manufacturer to utilize separate battery trays for each differently sized battery associated with a particular vehicle. In this regard, the battery hold-down members 72, 156 along with the ramped members 58, 112 are configured to cooperate with each other and at least one clamp member selectively received in either recessed area 68 and/or 148 to retain battery 54A having various different longitudinal lengths. For purposes of discussion, battery 54A can be a typical battery, such as an industry standard lead-acid battery having a generally standard width 202 between longitudinal sides 46, 50, and a variable length between sides 38 and 42, as shown for example in FIGS. 5 and 6. For example, battery 54A can be provided in two different sizes, where the width 202 remains the same, but the length can vary. In particular, battery 54A shown in FIG. 5 can have a first length 206A that is longer than a second length 206B of battery 54B shown in FIG. 6. As will be discussed below, battery tray 10 can be configured to receive either battery 54A or 54B in container area 34 and positively retain or secure either battery to tray 10 with one of the clamp members discussed below.

With additional reference to FIGS. 4-8 and continuing reference to FIGS. 1-3, longitudinal walls 22, 26 along with side wall 18 provide for receiving and retaining either battery 54A or 54B in the same manner, while side wall 14 can engage side 38 of battery 54A or receive one of the clamp members discussed below to retain the shorter length battery 54B.

Figure 4:
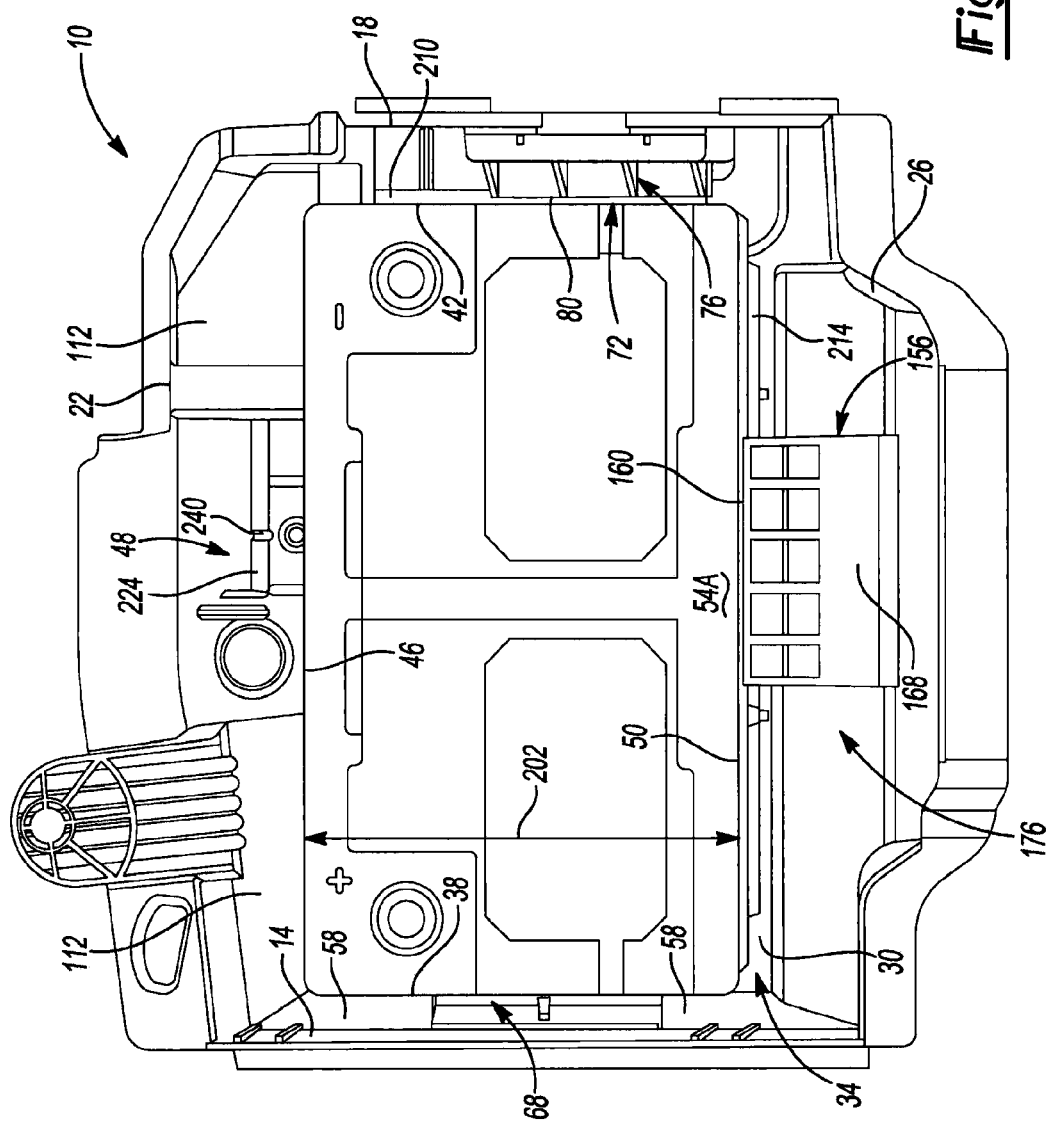
FIG. 4 is a top view of an exemplary first battery positioned in the battery tray of FIG. 1 according to the principles of the present disclosure.
Figure 5:
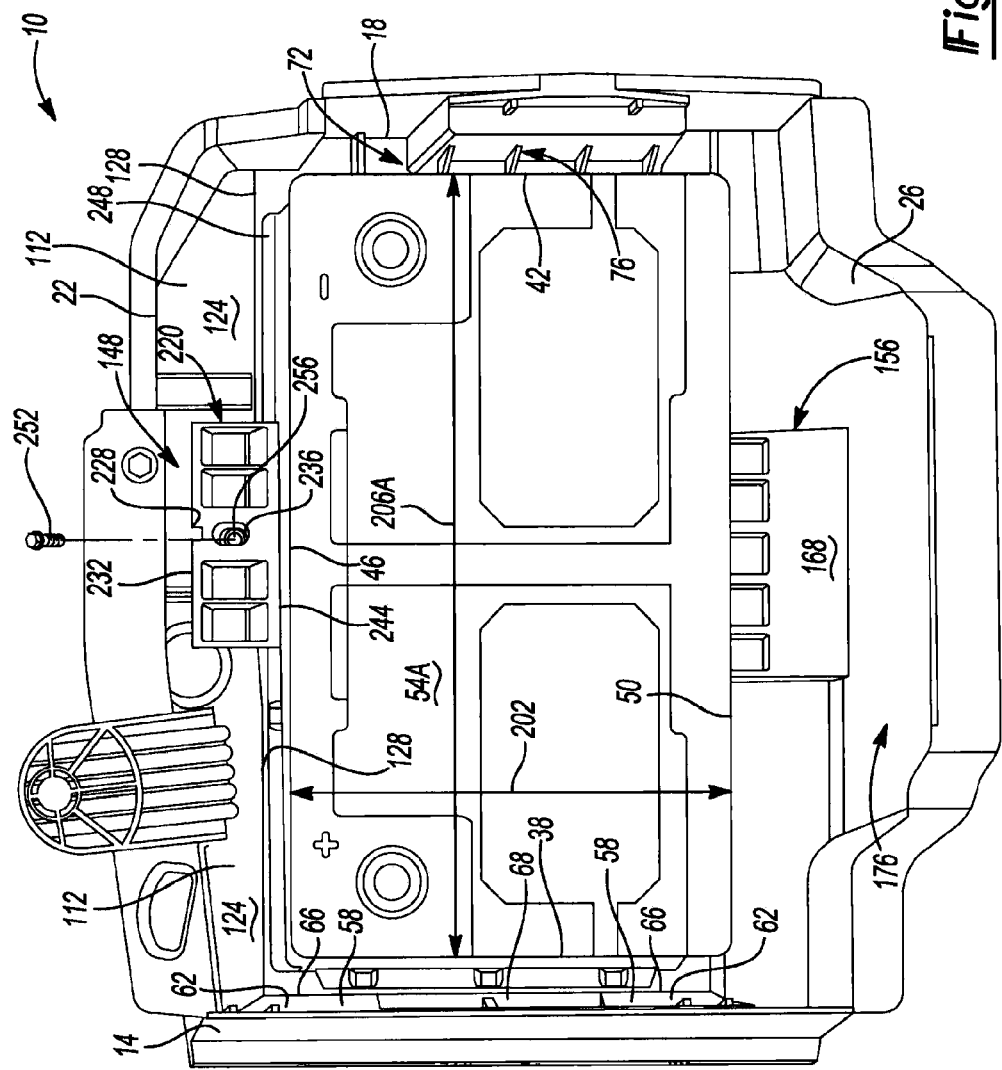
FIG. 5 is a top view of the battery and battery tray of FIG. 4 along with a first holding member according to the principles of the present disclosure.

With particular reference to FIGS. 4 and 5, battery tray 10 can be sized and shaped such that a perimeter of container area 34 defined by ramped members 58 and 112 of respective walls 14 and 22 along with battery hold down members 72 and 156 of walls 18 and 26 corresponds to a perimeter size and shape of battery 54A, as shown for example in FIG. 4. With this size relationship between battery 54A and tray 10, battery 54A can be slidably received onto deck 30 to the specific position shown in FIG. 4 without a need to reposition before securing battery 54A to tray 10 using one of the clamp members discussed below.

In particular, battery 54A can be received in container area 34 of tray 10 initially along or against walls 14 and 22, such that battery 54A engages associated ramped members 58 and 112 as battery 54A is lowered toward deck 30. Upon engagement with ramped members 58, 112, battery 54A can slide along guide surfaces 62, 124 while being urged toward respective hold down members 72, 156. When battery 54A moves along guide surfaces to respective ends 66, 128, battery sides 42 and 50 are urged into engagement or substantial engagement with respective battery hold down members 72 and 156. In particular, battery toe flanges or protrusions 210, 214 extending from sides 42, 50 are received under ribs 80, 160 of respective battery hold down members 72, 156 when sides 38, 42 of battery 54A are at the first end of respective ramped members 58, 112, as shown in FIG. 4 with reference to FIG. 5.

It will be appreciated that the sloped or angled nature of the guide portion 76 of battery hold down member 72 and the angled upper surface 168 of battery hold down member 156 can urge battery 54A against ramped members 58 and 112 to the extent battery 54A is offset from wall 14 and/or 22 during receipt in container area 34 of battery tray 10.

At this point, battery 54A can be resting on deck 30 and constrained or substantially constrained from sliding on deck 30 by ramped members 58 and 112 on two sides and hold down members 72, 156 on the remaining two sides. Further, battery hold down members 72, 156 can additionally constrain battery 54A from upward vertical movement relative to deck 30. A clamping or mounting member 220 can be positioned in recessed area 148 in engagement with first longitudinal wall 22 and/or a protrusion 224 extending therefrom and also in engagement with side 46 of battery 54A. Clamping member 220 can include a vertically extending slot 228 on a first side 232 and a fastener receiving aperture 236, as shown for example in FIG. 5. Clamping member 220 can be positioned in recessed area 148 such that slot 228 engages a vertically extending rib 240 (FIG. 3) and a second side 244 engages battery 54A and/or a toe flange 248, as shown in FIG. 5. A fastener 252 can be received through aperture 236 and threadably engaged with an internally threaded hole or fastener 256 associated with deck 30 to secure clamping member 220 to battery tray 10, as shown in FIG. 5 with reference to FIG. 4. In one exemplary configuration, clamping member 220 may not be used, as shown for example in FIG. 4.

Figure 6:
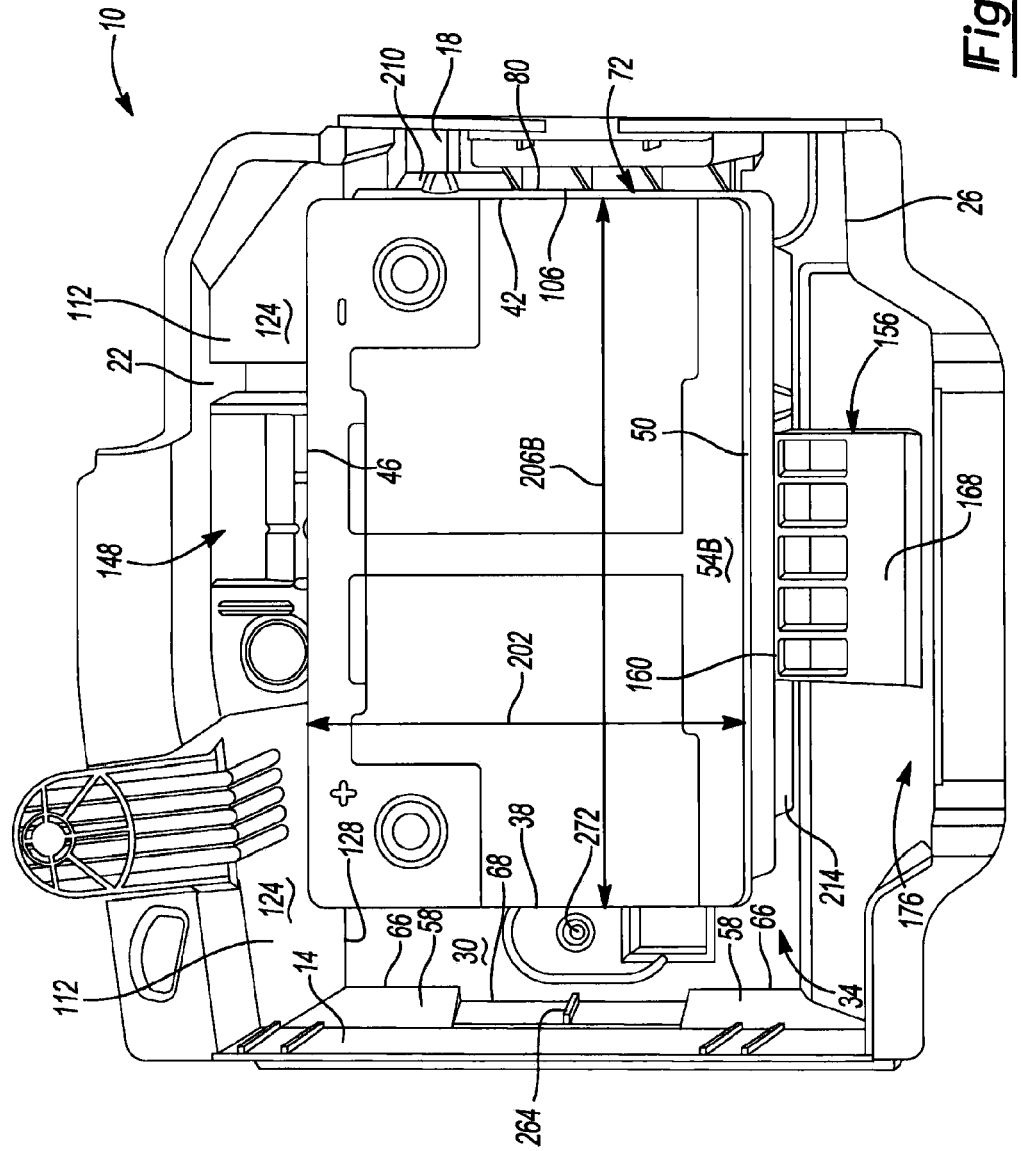
FIG. 6 is a top view of a second exemplary battery positioned in the battery tray of FIG. 1 according to the principles of the present disclosure.

With additional reference to FIGS. 6-8 and continuing reference to FIGS. 1-5, operation of battery tray 10 in connection with battery 54B will now be discussed in greater detail. As shown in FIG. 6, battery 54B can be positioned in container area 34 of battery tray 10 such that sides 42 and 50 engage respective battery hold down members 72 and 156. In particular, toe flanges 210, 214 can be received under respective ribs 80, 160 such that the outer surfaces 106, 162 of ribs 80, 160 engage or substantially engage sides 42, 50 of battery 54B. The ramped members 112 associated with longitudinal wall 22 can guide battery 54B into cooperation or engagement with battery hold down member 156 in a similar manner as discussed above with battery 54A. Battery 54B can be slid into engagement with battery hold down member 72 such that toe flange 210 is positioned under rib 80 upon battery 54A resting on deck 30.

Figure 7:
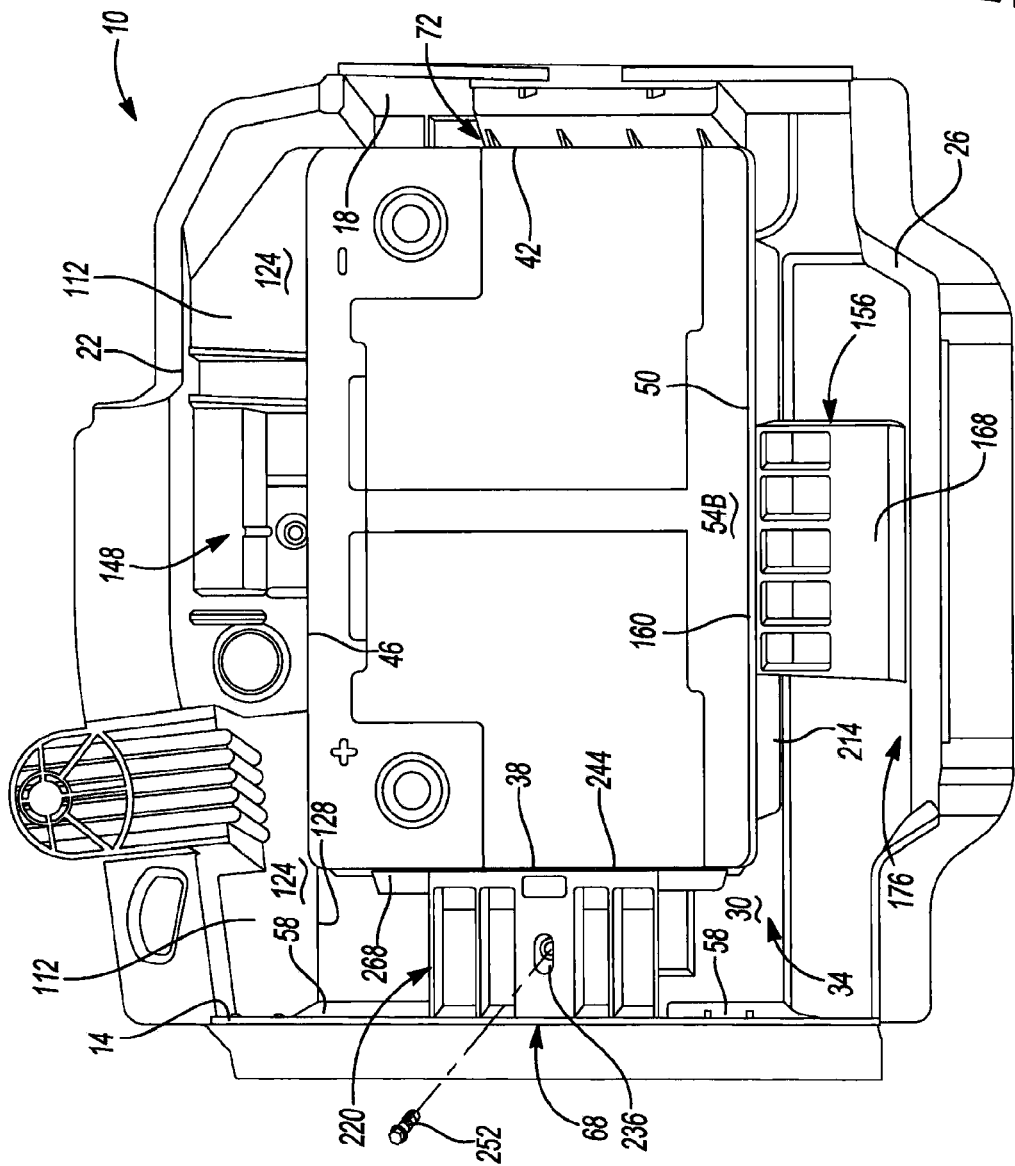
FIG. 7 is a top view of the battery and battery tray of FIG. 6 along with a second holding member according to the principles of the present disclosure.
Figure 8:
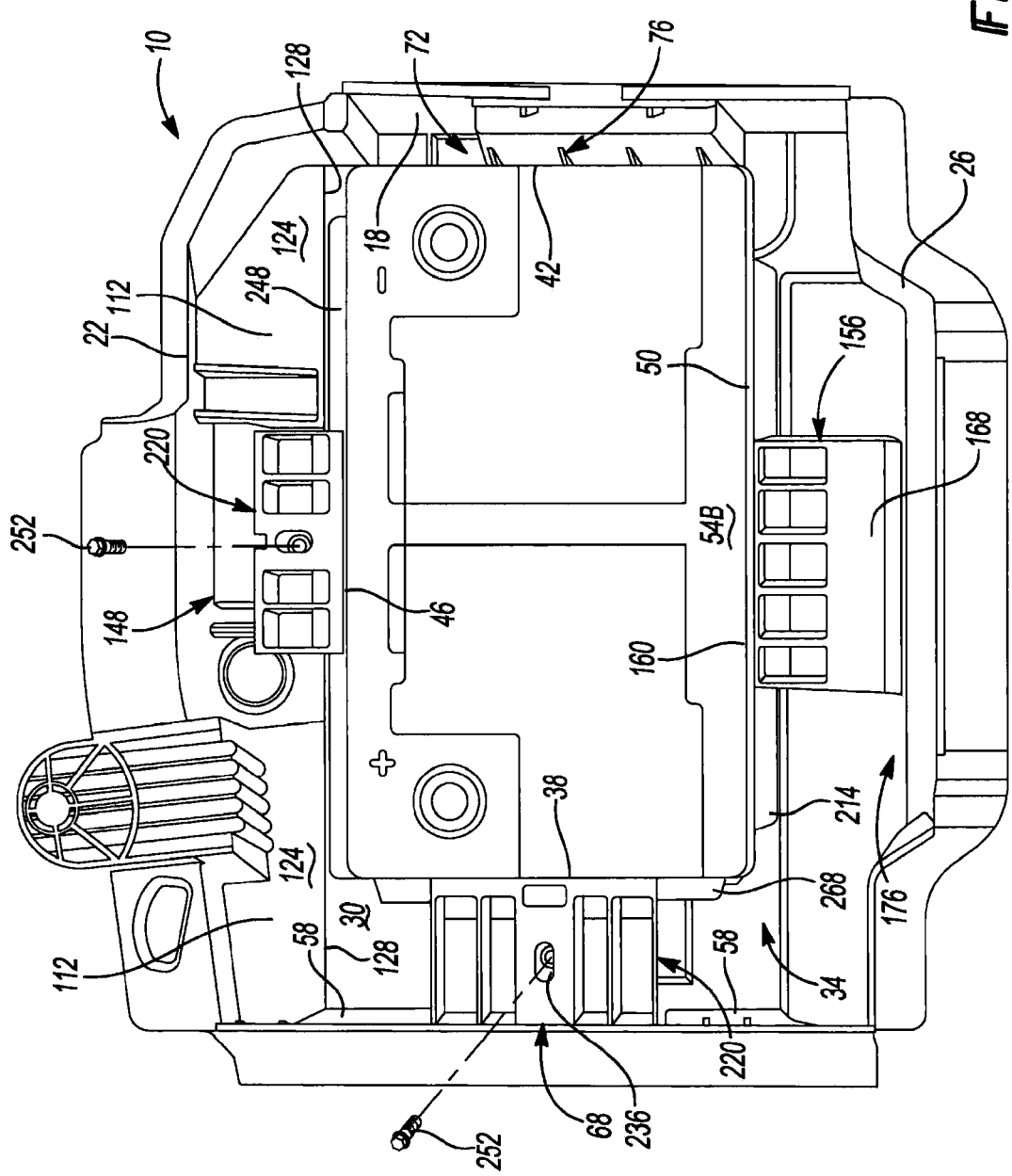
FIG. 8 is a top view of the battery and battery tray of FIG. 6 along with the first and second holding members according to the principles of the present disclosure.

At this point, clamping member 220 can be positioned in recessed area 68 associated with side wall 14 such that slot 228 engages a rib 264 and second side 244 engages a toe flange 268 and/or side 38 of battery 54B, as shown in FIG. 7 with reference to FIG. 6. Fastener 252 can be positioned through aperture 236 and secured to internally threaded hole or fastener 272 associated with deck 30 in a similar manner as discussed above for battery 54A. This can provide for securing a perimeter of battery 54B on all four sides from horizontal sliding relative to deck 30 and securing battery 54B on three sides from vertical movement relative to deck 30, as shown in FIG. 7. Another optional clamping member 220 can be positioned in recessed area 148 for additional securement of battery 54B in a similar manner as discussed above with battery 54A. It should be appreciated, however, that this optional clamping member 220 does not need to be utilized with battery 54B. It should also be appreciated that clamping member 220 can optionally have a different, larger width when used in recess 68 as opposed to recess 148.

Figure 9:
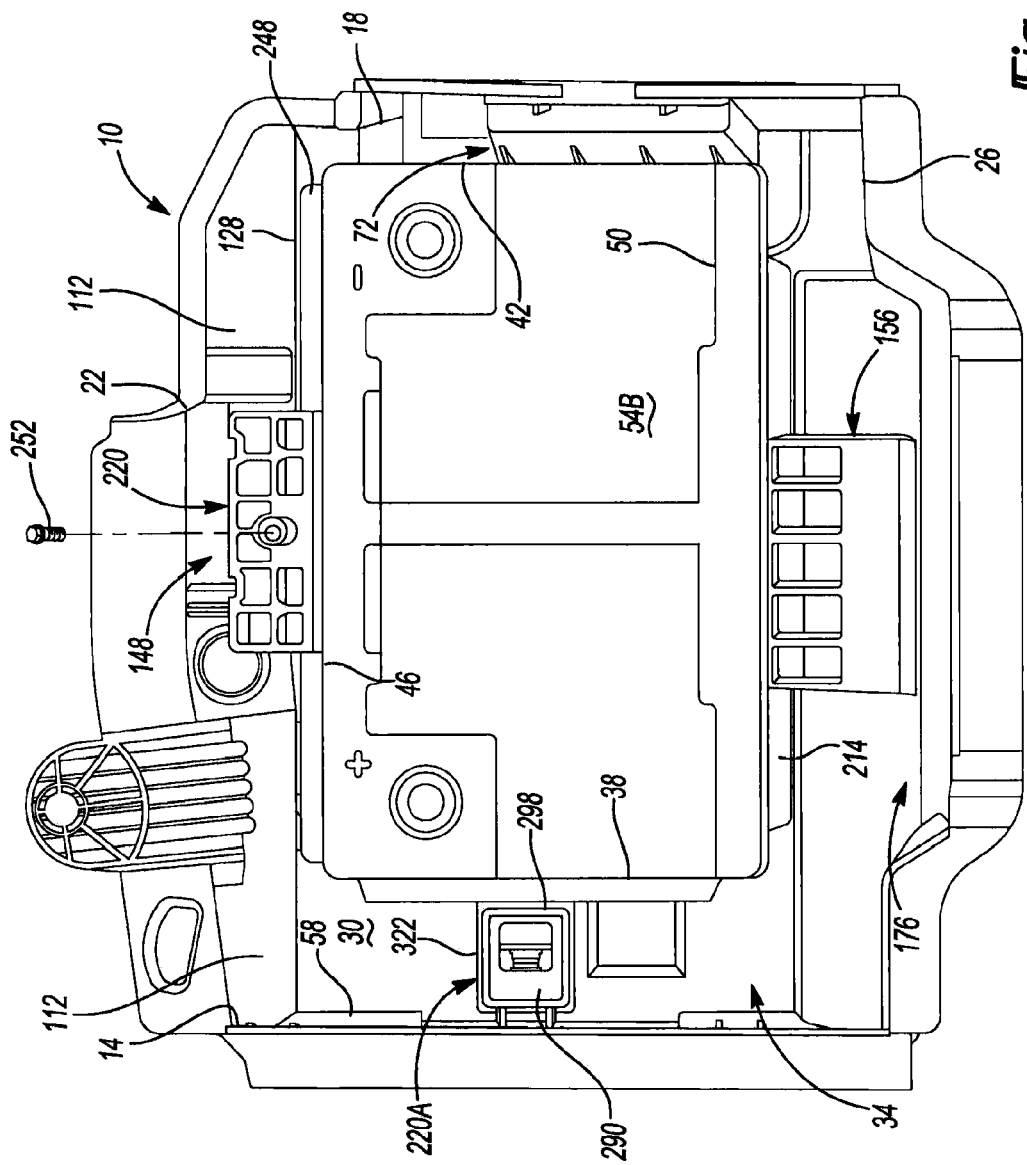
FIG. 9 is a top view of an exemplary battery operatively associated with an exemplary battery tray having a third holding member according to the principles of the present disclosure.
Figure 10:
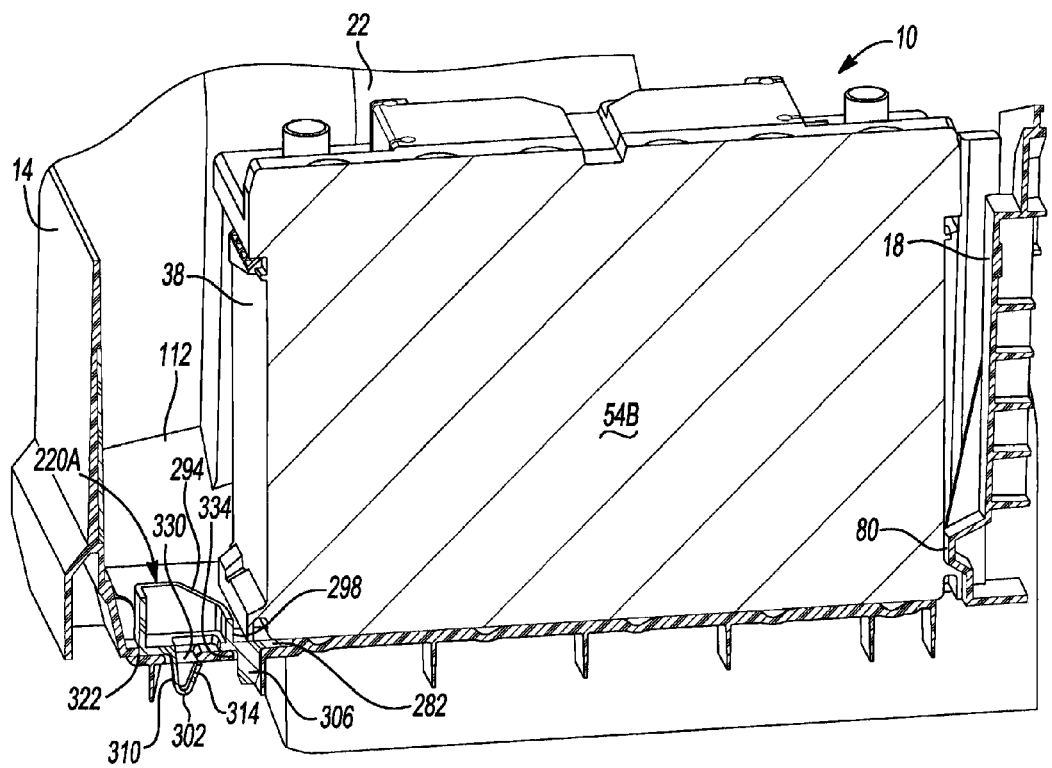
FIG. 10 is a sectional view of the battery and battery tray of FIG. 9 according to the principles of the present disclosure.
Figure 11:
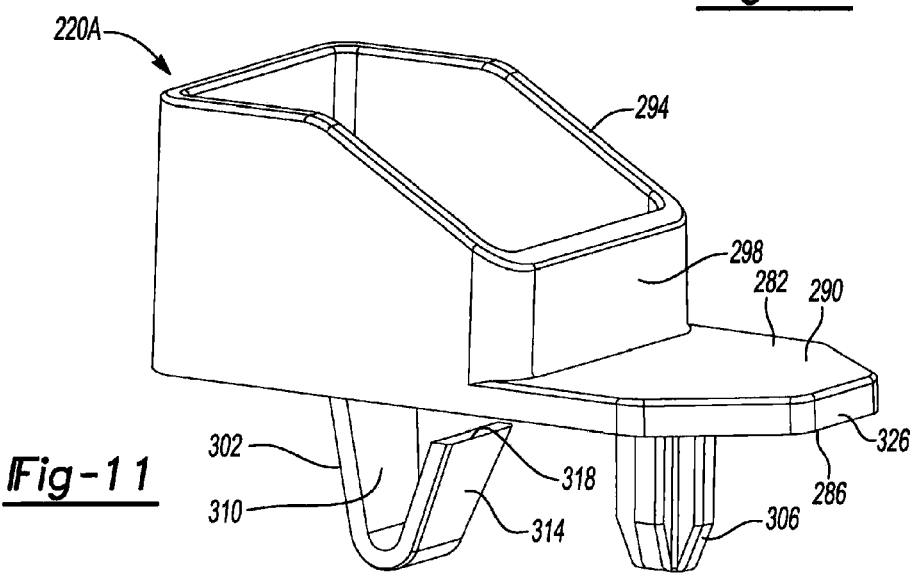
FIG. 11 is a perspective view of the third holding member according to the principles of the present disclosure.
Figure 12:
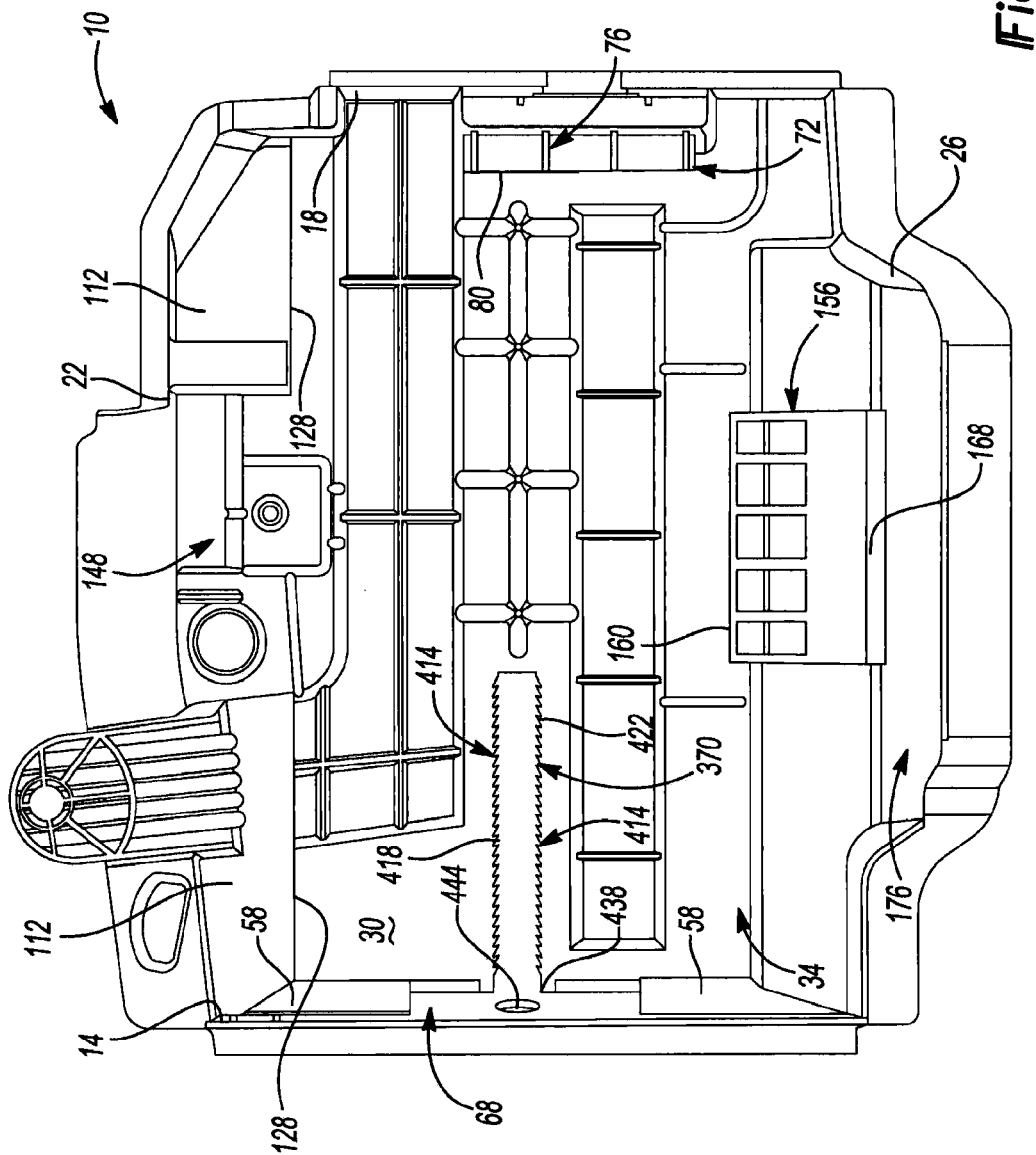
FIG. 12 is a top view of an exemplary battery tray according to the principles of the present disclosure.

With additional reference to FIGS. 9-11 and continuing reference to FIGS. 1-8, an alternative clamping member 220A will now be discussed. Clamping member 220A can be used in place of clamping member 220 that was selectively associated with side wall 14. Clamping member 220A can include a body 282 defining a deck engaging surface 286 and an opposite upper surface 290. A battery engaging member 294 can extend upwardly from upper surface 290 and can include a battery engaging face 298. A resilient retaining member 302 can extend or protrude from the deck engaging surface 286 along with a locating member or pin 306. In the exemplary embodiment illustrated, the resilient retaining member 302 includes a first leg 310 extending from surface 286 in a first direction and a second leg 314 extending from first leg 310 in a direction back toward surface 286. Second leg 314 can stop short of surface 286 so as to allow a portion of deck 30 to extend between an end 318 of second leg 314 and deck engaging surface 286, as will be discussed in greater detail below.

Clamping member 220A can be positioned in a recess 322 formed in deck 30 and sized and shaped to be larger than a perimeter 326 of body 282. In one exemplary configuration, recess 322 can be complimentary in size and shape to perimeter 326. A slot 330 and an aperture 334 can be formed in deck 30 within recess 322 and configured to receive the respective retaining member 302 and pin 306. In particular, retaining member 302 can be positioned through slot 330 such that the first and second legs 310, 314 are compressed toward each other upon sliding through slot 330 and then relax to the position shown in FIG. 10 where second leg 314 extends beyond slot 330 such that a portion of deck 30 is positioned between second leg 314 and surface 286 of clamping member 220A. Pin 306 can be positioned in aperture 334, as also shown in FIG. 10.

In operation, retaining member 302 can be snap-fit into recess 322 in the manner discussed above prior to positioning of battery 54B in container area 34. As can be seen in FIG. 10 with reference to FIG. 9, retaining member 302 can be positioned in recess 322 such that battery 54B can be positioned over a portion of body 282 so as to aid in retaining clamping member 220A coupled to deck 30. Clamping member 220A can be removed from deck 30 upon removing battery 54B by compressing second leg 314 toward first leg 310 and sliding the compressed retaining member 302 through slot 330. Clamping member 220 can optionally be positioned relative to recessed area 148 to provide additional retention of battery 54B, as shown for example in FIG. 9.

Turning now to FIGS. 12-16 with continuing reference to FIGS. 1-11, an alternative clamping member arrangement 350 (FIG. 13) will now be discussed. Clamping arrangement 350 can include a slide or clamping member 220B configured to be received in and selectively movable relative to a channel 370 formed in deck 30 adjacent side wall 14, as shown for example in FIG. 16 with reference to FIGS. 12 and 13. Clamping member 220B can include a body 354 having a first member 358 and a retaining member 362 extending therefrom. In the exemplary configuration illustrated, the first member 358 can be in the form of a rectangular member 366 sized and shaped to be complimentary to channel 370 formed in deck 30. First member 358 can include a first end 376, a second opposite end 380 and opposed sides 384, 388 extending therebetween. A plurality of resilient engagement members 392 can extend from sides 384, 388 at an acute angle thereto and in a direction toward the second end 380, as shown for example in FIG. 16. Retaining member 362 can extend from a top surface 396 of first member 358 at the second end 380 thereof. Retaining member 362 can include a battery engaging face 402 and first and second surfaces 404, 406 extending about sides 384, 388 and configured to engage deck 30 when first member 358 of clamping member 220B is positioned within channel 370.

Channel 370 can include a depth 408 corresponding to a height 410 of first member 358 such that first member 358 can be flush or slightly below deck 30. This can provide for first member 358 being able to slide in channel 370 under battery 54B, as will be discussed in greater detail below. Channel 370 can include a plurality of ratchet teeth 414 positioned on opposed sides 418, 422 and configured to engage resilient members 392. The ratchet teeth 414 can cooperate to allow selective movement of clamping member 220B in a first direction toward side wall 18 and prevent movement in a second opposite direction toward side wall 14. In this regard, resilient members 392 can slide and flex over ratchet teeth 414 when moving in the first direction in channel 370, but a free end 426 of resilient members 392 will engage an end face 430 of a particular one of the ratchet teeth 414 when clamping member 220B is urged in the second direction toward side wall 14.

Figure 13:
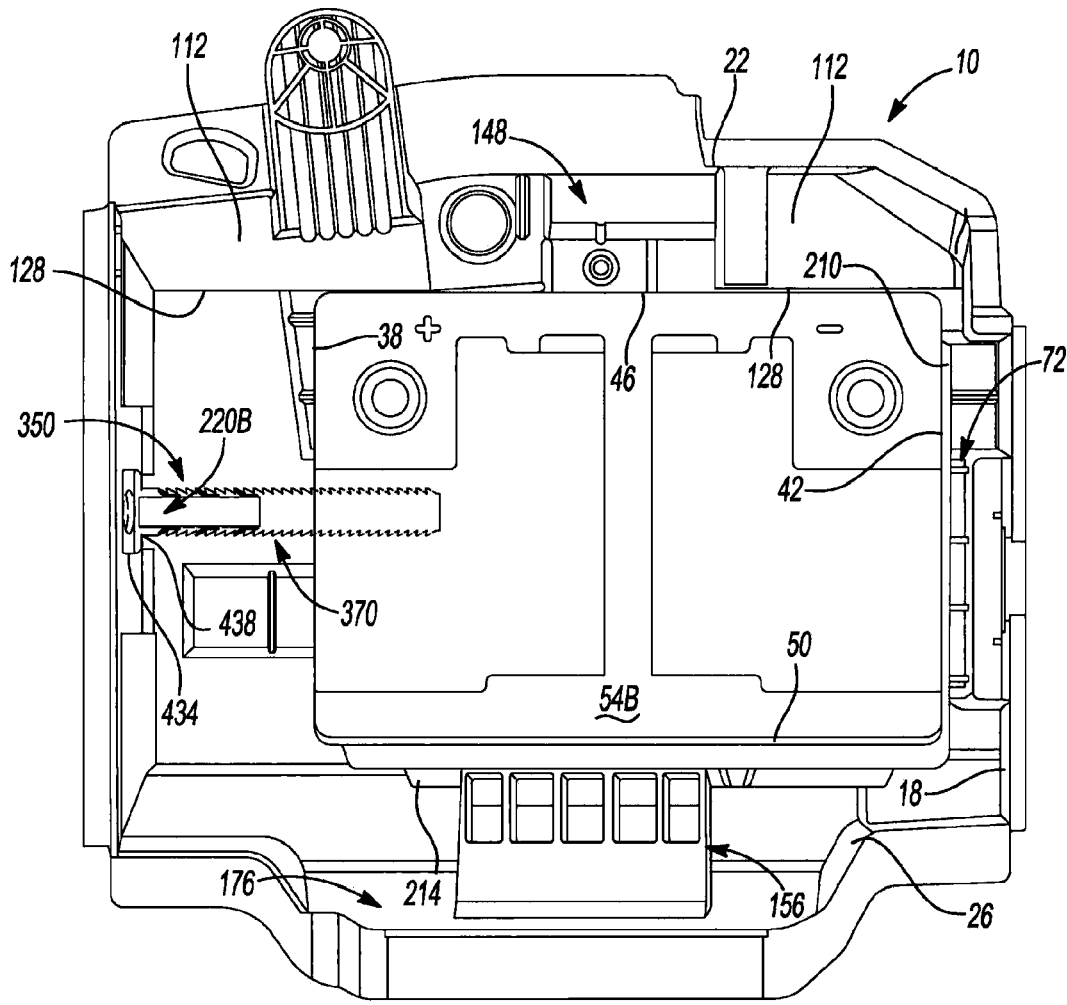
FIG. 13 is a top view of a slide clamp and the second battery operatively associated with the battery tray of FIG. 12 according to the principles of the present disclosure.
Figure 14:
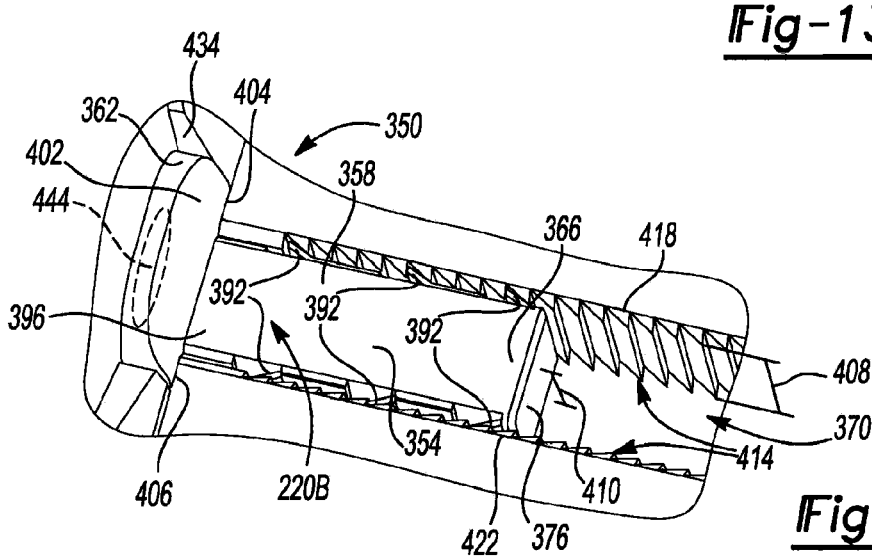
FIG. 14 is an enlarged view of the slide clamp positioned in the battery tray of FIG. 13 according to the principles of the present disclosure.
Figure 15:
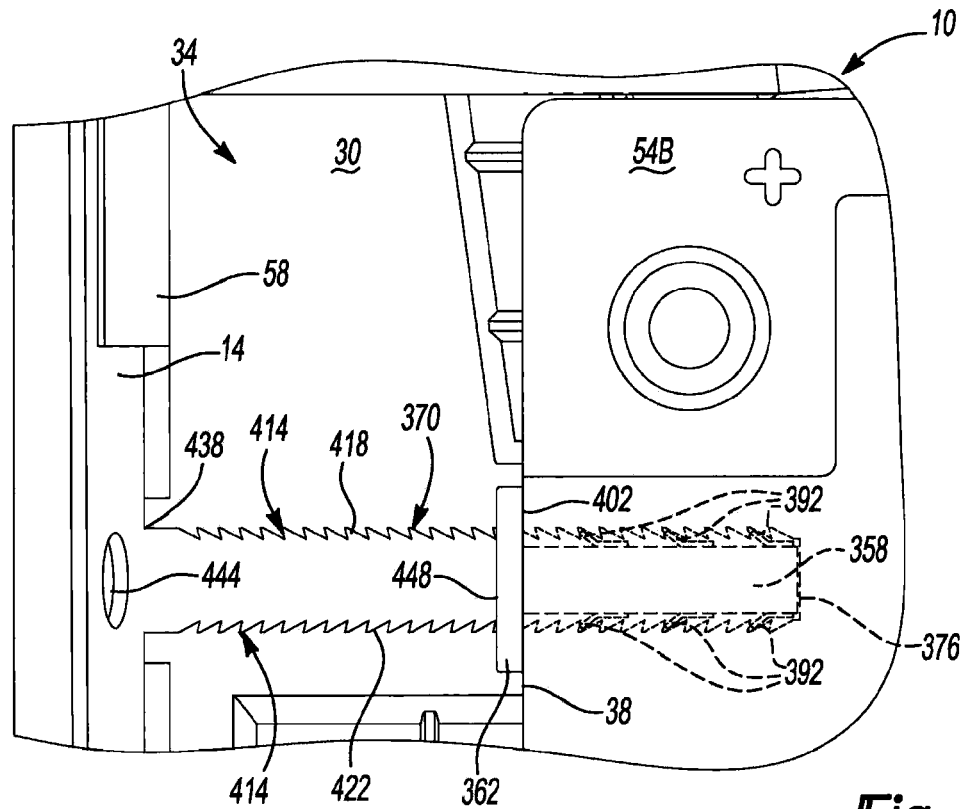
FIG. 15 is a partial top view of the battery and battery tray of FIG. 13 with the slide clamp in locking engagement with the second battery according to the principles of the present disclosure.
Figure 16:
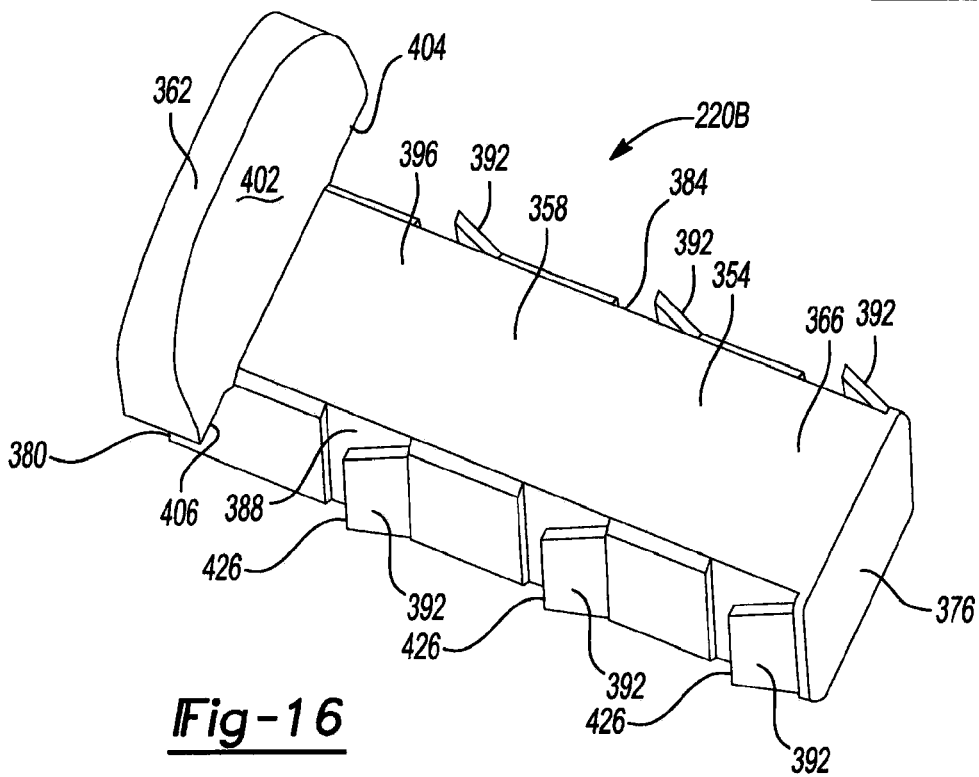
FIG. 16 is a perspective view of the slide clamp according to the principles of the present disclosure.

Side wall 14 can include a recess 434 positioned proximate a first end 438 of channel 370 and sized and shaped to receive retaining member 362 therein when clamping member 220B is positioned at the first end 438 of channel 370, as shown in FIGS. 13 and 14. An aperture 444 can be formed in side wall 14 through recess 434 so as to provide access to clamping member 220B from outside of container area 34. In particular, a tool (not shown) can be inserted through aperture 444 and into engagement with a second side 448 of retaining member 362 to urge clamping member 220B in the first direction toward side wall 18 and/or battery 54B.

In operation, clamping member 220B can be positioned in channel 370 before or after positioning battery 54B in container area 34 in the manner discussed above. To the extent that the first member 358 includes a longitudinal length such that it would extend under a footprint of battery 54B when retaining member 362 is positioned in recess 434, then clamping member 220B would be positioned in channel 370 prior to container area 34 receiving battery 54B. Clamping member 220B can then be slidably moved in channel 370 in the first direction toward battery 54B such that the battery engagement face 402 of retaining member 362 engages battery 54B. During this movement, resilient members 392 can flexingly slide over ratchet teeth 414 until retaining member engages battery 54B. If battery 54B has not been urged into engagement with battery hold down member 72, clamping member 220B can be used to slide or urge battery 54B toward side wall 18 such that toe flange 214 is received under rib 160. The free end 426 of resilient members 392 can then engage the end face 430 of an associated ratchet tooth 414 to prevent clamping member 220B from sliding toward side wall 14. Clamping member 220 can optionally be positioned relative to recessed area 148 and used to provide additional retention of battery 54B similar to the optional additional retention discussed above in connection with clamping member 220A.

It is understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A battery tray for a vehicle, comprising:
   a deck;
   first and second opposed longitudinal walls extending from the deck and cooperating with first and second opposed side walls extending from the deck and between the first and second longitudinal walls to form a container area adapted to receive at least one of a first and a second battery, the first battery having a longer longitudinal length than the second battery;
   the second longitudinal wall and the second side wall including respective first and second battery hold down members each having a rib adapted to engage a retention feature of the first or second battery;
   the first longitudinal wall and the first side wall including respective first and second ramped members adapted to urge at least the first battery into engagement with the respective first and second battery hold down members upon the first battery being positioned on the deck; and
   a first clamping member removably coupled to the battery tray relative to one of the first longitudinal or side walls and adapted to engage the retention feature of the one of the first and second batteries positioned in the container area.

2. The battery tray of claim 1, wherein the first ramped member comprises a first pair of ramped members and the second ramped member comprises a second pair of ramped members, the ramped members of each of the first and second pair of ramped members being horizontally spaced from each other so as to define a recess therebetween in cooperation with the respective first side wall and the first longitudinal wall.

3. The battery tray of claim 2, wherein the first clamping member is positioned in the recess associated with the first longitudinal wall and adapted to engage the retention feature of the first battery.

4. The battery tray of claim 2, wherein the first clamping member is positioned in the recess associated with the first side wall and adapted to engage the retention feature of the second battery.

5. The battery tray of claim 4, further comprising a second clamping member configured to be positioned in the recess associated with the first longitudinal wall and removably coupled to the battery tray, the second clamping member adapted to engage the retention feature of the second battery.

6. The battery tray of claim 1, wherein each battery hold down member comprises an angled battery guide surface extending upwardly therefrom in a direction away from the deck.

7. The battery tray of claim 1, wherein the ribs of the first and second battery hold down members extend horizontally and are vertically spaced from the deck.

8. The battery tray of claim 1, wherein the first longitudinal and side walls each comprise a vertically extending protrusion configured to selectively engage a vertically extending slot formed in the first clamping member.

9. The battery tray of claim 1, wherein the first and second longitudinal and side walls, the deck, the first and second ramped members and the first and second battery hold down members are integrally formed as a single unitary member.

10. The battery tray of claim 1, wherein the first clamping member includes a snap-fit retention arrangement configured to facilitate removably coupling the first clamping member to the deck in a snap-fit manner.

11. The battery tray of claim 10, wherein the first clamping member includes an elongated body having an upper surface and an opposite lower surface from which the snap-fit retention arrangement protrudes, the body configured to be received in a recess formed in the deck adjacent the first side wall, the body sized and shaped such that the body is adapted to extend under a footprint of the second battery upon receipt of the second battery in the container area.

12. The battery tray of claim 1, wherein the deck includes a longitudinally extending channel formed therein adjacent the first side wall, and wherein the first clamping member includes a slide clamping member having an elongated body member configured to be received in the channel and a battery engaging member extending from the body member, the slide clamping member configured to cooperate with the channel to allow sliding in a first direction relative to the channel such that the battery engaging member is adapted to engage the first or second battery and to prevent sliding in a second opposite direction.

13. The battery tray of claim 12, wherein the channel includes ratchet teeth formed on opposed sides thereof, and wherein the body member includes outwardly extending resilient members protruding from opposed lateral sides thereof, the resilient members configured to cooperate with the ratchet teeth to allow movement of the slide clamping member in the first direction toward the second side wall and prevent movement of the slide clamping member in the second opposite direction toward the first side wall.

14. The battery tray of claim 13, wherein the first side wall includes a depression formed therein and an aperture formed therethrough in the area of the depression, the battery engaging member configured to be received in the depression when the slide clamping member is in a stowed position and configured to be accessed through the aperture to urge the battery clamping member in the first direction toward the second side wall.

15. The battery tray of claim 12, wherein the body member is adapted to extend under a footprint of the first or second battery upon engagement of the battery engaging member with the first or second battery.

16. A battery tray for a vehicle, comprising:
a deck;
first and second opposed longitudinal walls extending from the deck and cooperating with first and second opposed side walls extending from the deck and between the first and second longitudinal walls to form a container area adapted to receive at least one of a first and a second battery, the first and second longitudinal and side walls integrally formed with the deck, the first battery having a longer longitudinal length than the second battery;
the second longitudinal wall and the second side wall including respective first and second battery hold down members each having a horizontally extending rib adapted to engage a retention feature of the first or second battery and an upper angled guide surface, the ribs being vertically spaced apart from the deck and the angled guide surfaces extending from the ribs along the respective second longitudinal and side walls;
the first longitudinal wall and the first side wall including respective first and second ramped members adapted to urge at least the first battery into engagement with the respective first and second battery hold down members upon the first battery being positioned on the deck; and
a first clamping member removably coupled to the battery tray relative to the first side wall and adapted to engage the retention feature of the one of the first and second batteries positioned in the container area.

17. The battery tray of claim 16, wherein the deck includes a channel formed therein adjacent the first side wall and longitudinally extending toward the second side wall, and wherein the first clamping member includes a slide clamping member having an elongated body member configured to be received in the channel and a battery engaging member extending from the body member, the slide clamping member configured to cooperate with the channel to allow sliding in a first direction relative to the channel such that the battery engaging member is adapted to engage the first or second battery and to prevent sliding in a second opposite direction.

18. The battery tray of claim 17, wherein the channel includes ratchet teeth formed on opposed sides thereof, and wherein the body member includes outwardly extending resilient members protruding from opposed lateral sides thereof, the resilient members configured to cooperate with the ratchet teeth to allow movement of the slide clamping member in the first direction toward the second side wall and prevent movement of the slide clamping member in the second opposite direction toward the first side wall.

19. The battery tray of claim 16, wherein the first clamping member includes a snap-fit retention arrangement configured to facilitate removably coupling the first clamping member to the deck in a snap-fit manner.

20. The battery tray of claim 19, wherein the first clamping member includes an elongated body having an upper surface and an opposite lower surface from which the snap-fit retention arrangement protrudes, the body having a battery engaging member extending from the upper surface and configured to be received in a recess formed in the deck adjacent the first side wall when the slide clamping member is in a stowed position, the body sized and shaped such that the battery engaging member is adapted to engage the first or second battery and the body is adapted to extend under a footprint of the first or second battery upon receipt of the first or second battery in the container area.

* * * * *